(12) United States Patent
Bolender

(10) Patent No.: US 7,865,038 B2
(45) Date of Patent: Jan. 4, 2011

(54) RESOLUTION AND SENSITIVITY BALANCE METRIC

(75) Inventor: Robert J. Bolender, Santa Clara, CA (US)

(73) Assignee: Synaptics Incorporated, Santa Clara, CA (US)

( * ) Notice: Subject to any disclaimer, the term of this patent is extended or adjusted under 35 U.S.C. 154(b) by 926 days.

(21) Appl. No.: 11/495,071

(22) Filed: Jul. 28, 2006

(65) Prior Publication Data

US 2007/0230822 A1    Oct. 4, 2007

Related U.S. Application Data

(60) Provisional application No. 60/789,495, filed on Apr. 4, 2006.

(51) Int. Cl.
G06K 9/00 (2006.01)
G06K 9/36 (2006.01)
G01C 19/00 (2006.01)
G01C 25/00 (2006.01)

(52) U.S. Cl. .................. 382/286; 382/121; 382/123; 702/104; 702/116

(58) Field of Classification Search .................. 382/286
See application file for complete search history.

(56) References Cited

U.S. PATENT DOCUMENTS

| | | | | |
|---|---|---|---|---|
| 4,353,552 A * | 10/1982 | Pepper, Jr. | ................... | 463/37 |
| 4,585,001 A * | 4/1986 | Belt | .............................. | 607/9 |
| 4,872,945 A * | 10/1989 | Myers et al. | .................. | 438/13 |
| 5,276,631 A * | 1/1994 | Popovic et al. | ............... | 702/104 |
| 5,373,457 A * | 12/1994 | George et al. | ................... | 703/2 |
| 5,505,072 A * | 4/1996 | Oreper | ....................... | 73/1.59 |
| 6,122,493 A * | 9/2000 | Kobayashi et al. | ........ | 455/193.1 |
| 6,230,543 B1 * | 5/2001 | Froehling et al. | ............ | 73/1.06 |
| 6,239,790 B1 * | 5/2001 | Martinelli et al. | ........... | 345/174 |
| 6,512,838 B1 | 1/2003 | Rafii et al. | | |
| 6,927,722 B2 * | 8/2005 | Hong | .......................... | 341/172 |
| 7,062,075 B2 * | 6/2006 | Morimura et al. | ........... | 382/124 |
| 7,126,109 B2 * | 10/2006 | Goldman et al. | ....... | 250/231.14 |
| 7,497,114 B2 * | 3/2009 | Spiess | ...................... | 73/146.2 |
| 7,591,165 B2 * | 9/2009 | Papakostas et al. | .......... | 73/1.59 |
| 2001/0054894 A1 * | 12/2001 | Goldfine et al. | ........ | 324/207.17 |
| 2003/0063775 A1 | 4/2003 | Rafii et al. | | |
| 2005/0052429 A1 * | 3/2005 | Philipp | ...................... | 345/173 |
| 2005/0164375 A1 * | 7/2005 | Inoue | ...................... | 435/287.2 |
| 2005/0237308 A1 * | 10/2005 | Autio et al. | .................. | 345/173 |
| 2005/0280881 A1 * | 12/2005 | Stokes et al. | ................ | 358/504 |

OTHER PUBLICATIONS

ISA/US, International Search Report and Written Opinion for International Application No. PCT/US07/65395, 8 pages, Mar. 31, 2008.

* cited by examiner

*Primary Examiner*—Vikkram Bali
*Assistant Examiner*—Michelle Entezari

(57) ABSTRACT

One embodiment in accordance with the invention is a method for determining a resolution metric that can include accessing sampled data for at least one of a plurality of sensor channels. Additionally, the method can include determining a required resolution associated with at least one of the plurality of sensor channels. A channel resolution can be determined that is associated with at least one of the plurality of sensor channels. Furthermore, the resolution metric can be determined based on the channel resolution and the required resolution, wherein the resolution metric can be provided to a user.

23 Claims, 7 Drawing Sheets

RESOLUTION AND SENSITIVITY BALANCE METRIC

CROSS REFERENCE TO RELATED APPLICATIONS

This patent application claims the benefit of the co-pending U.S. Provisional Patent Application No. 60/789,495 entitled "Resolution and Sensitivity Balance Metric" by Robert Bolender, filed Apr. 4, 2006, which was assigned to the assignee of the present invention, the disclosure of which is hereby incorporated by reference.

BACKGROUND

Sensor systems are used in many different applications to measure and track objects and parameters. One example of a sensor system is a touch sensor. Touch sensors are typically electrically responsive to physical contact or proximity with the sensor. For example, a capacitive touch sensing system measures capacitance to determine parameters of touch between an object (e.g., a user's finger, a stylus, a probe, etc.) and the sensor. The resolution of the touch sensor depends on many factors, including the physical characteristics of the sensor. It is noted that many times, the resolution can differ between similar touch sensors (e.g., same model) because of slight manufacturing differences.

Additionally, in a touch sensor system with adjustable resolution of the measuring electronics and a separately adjustable sensitivity, it is often possible to set the resolution of the system and the sensitivity to mutually inappropriate settings. For example, if the resolution is quite coarse and the required sensitivity is quite fine, the system will not necessarily be able to perform the required task.

Therefore, it is desirable to address one or more of the above issues.

SUMMARY

One embodiment in accordance with the invention is a method for determining a resolution metric that can include accessing sampled data for at least one of a plurality of sensor channels. Additionally, the method can include determining a required resolution associated with at least one of the plurality of sensor channels. A channel resolution can be determined that is associated with at least one of the plurality of sensor channels. Furthermore, the resolution metric can be determined based on the channel resolution and the required resolution, wherein the resolution metric can be provided to a user.

Embodiments of the invention include computer-readable instructions stored on a computer-usable medium wherein the computer-readable instructions when executed cause a computer system to perform a method for determining a resolution metric. The method can include accessing sampled data for at least one of a plurality of sensor channels and determining a required resolution associated with at least one of the plurality of sensor channels. Furthermore, the method can include determining a channel resolution associated with at least one of the plurality of sensor channels. Also, the method can include determining the resolution metric based on the channel resolution and the required resolution, wherein the resolution metric can be provided to a user.

Embodiments of the invention include a system for determining a resolution metric. The system can include a sampled data accessor for accessing sampled data for at least one of a plurality of sensor channels. Additionally, the system can include a required resolution determiner coupled to the sampled data accessor, the required resolution determiner for determining a required resolution associated with at least one of the plurality of sensor channels. Moreover, the system can include a channel resolution determiner coupled to the required resolution determiner, the channel resolution determiner for determining a channel resolution associated with at least one of the plurality of sensor channels. The system can also include a resolution metric determiner coupled to the channel resolution determiner, the resolution metric determiner for determining the resolution metric based on the channel resolution and the required resolution, wherein the resolution metric can be provided to a user.

Embodiments of the invention include a computer-implemented method for determining a resolution metric for a capacitive sensing system being designed. The computer-implemented method can include accessing sampled data for at least one of a plurality of sensor channels associated with the capacitive sensing system being designed and determining a required resolution associated with at least one of the plurality of sensor channels associated with the capacitive sensing system being designed. The method can also include determining a channel resolution associated with at least one of the plurality of sensor channels associated with the capacitive sensing system being designed. Furthermore, the method can include determining the resolution metric, for the capacitive sensing system being designed, based on the channel resolution and the required resolution, wherein the resolution metric can be provided to a user.

Embodiments of the invention include a method for obtaining a resolution metric without requiring complex user operations. The method can include accessing sampled data for at least one of a plurality of sensor channels, wherein the sampled data was generated by prompting a user to perform a task which does not require the user to perform the complex user operations. Additionally, the method can include determining the resolution metric by utilizing the sampled data, wherein the resolution metric can be provided to a user. In one embodiment, the task can include touching at least one of the plurality of sensor channels.

Embodiments of the invention provide a software system to calculate resolution metrics for each channel, which provides a considerable service to the customer of the system while avoiding teaching them the necessary understanding of the system complexity to evaluate it themselves. In particular, embodiments of the invention provide a software system to calculate resolution metrics without requiring complex user operations.

Embodiments of the invention also include a method for determining a resolution metric without requiring complex user operations. In one embodiment of the invention, complex user operations include operations such as determining a resolution for a channel, determining a resolution of a device, determining a required resolution of a channel or any other complex operations associated with determining resolutions in sensor systems.

In one embodiment of the invention, the method includes sampling at least one of a plurality of sensor channels without requiring complex user operations. The method further includes determining a required resolution associated with at least one of the plurality of sensor channels without requiring complex user operations and determining a channel resolution associated with at least one of the plurality of sensor channels. The method further includes determining a resolution metric based the channel resolution and the required resolution wherein the resolution metric can be provided to a user. In one embodiment of the invention, the resolution metric is provided to the user without requiring complex user operations.

In one embodiment of the invention, at design time, a system running the exemplary software of the invention can calculate the metric and use the metric to tell the designer which ones of several possible electronic configurations, e.g., printed circuit board (PCB) configurations, are adequate (e.g., beyond a threshold metric value) or which one is best suited to the job (e.g., greatest value of the metric). Also, designs with inadequate resolution can be flagged such that a designer can stop and modify it.

DETAILED DESCRIPTION

Reference will now be made in detail to various embodiments of the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the claims.

Furthermore, in the following detailed description of various embodiments in accordance with the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Figure 1:
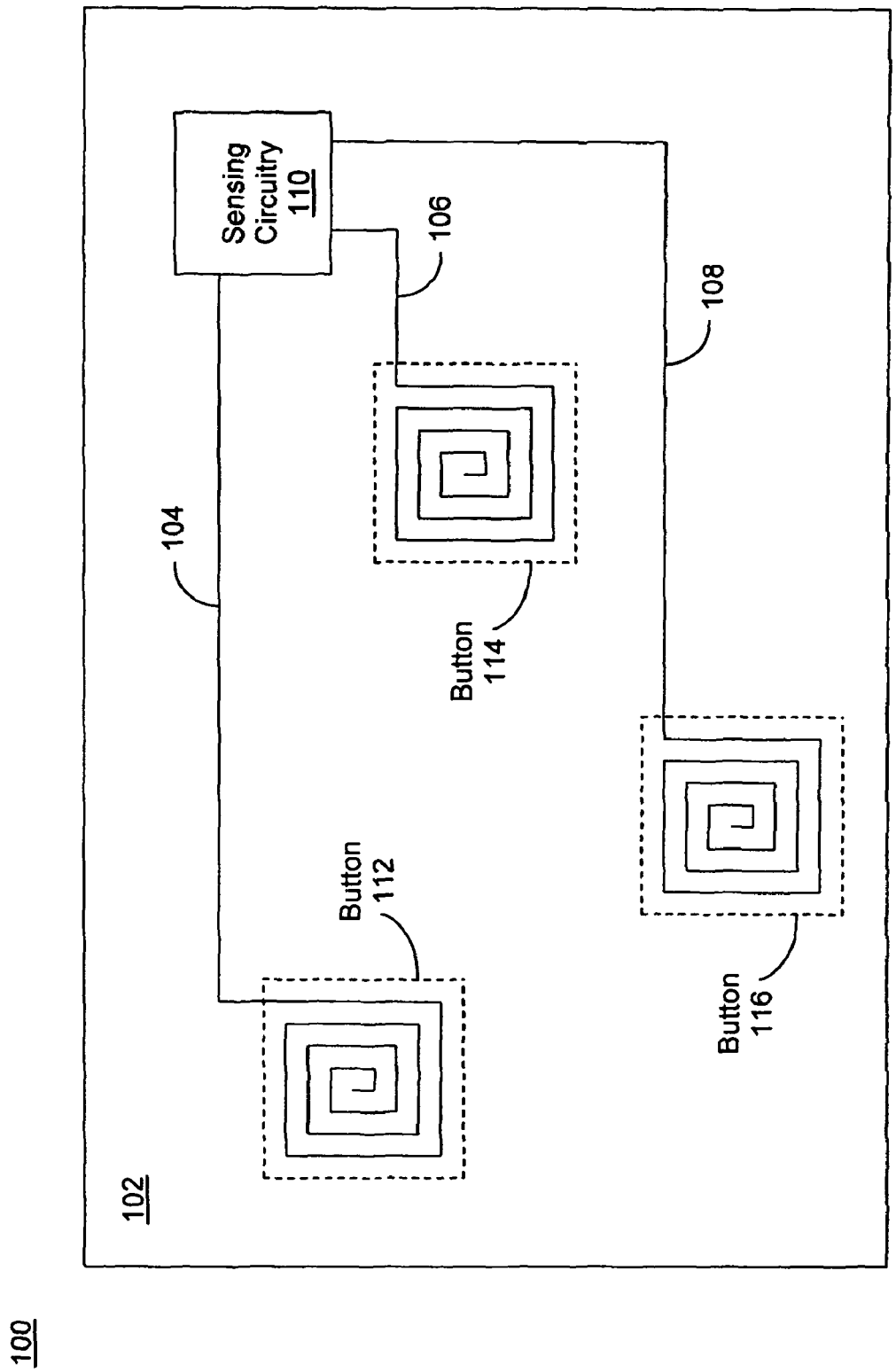
FIG. 1 is a plan view of an exemplary capacitive sensor that can be utilized with one or more embodiments in accordance with the invention.

FIG. 1 is a plan view of an exemplary capacitive sensor apparatus 100 that can be utilized with one or more embodiments in accordance with the invention. The capacitive sensor apparatus 100 can be utilized to communicate user input (e.g., using a user's finger, a probe, a stylus, or an object) to a computing device or other electronic device. For example, capacitive sensor apparatus 100 can be implemented as a capacitive touchpad device that can include three capacitive sensor buttons 112, 114 and 116 that can be disposed in or on a computing device or other electronic device to enable user interfacing with the computing or electronic device. Note that one or more embodiments in accordance with the invention can be utilized with a capacitive touchpad device similar to capacitive sensor 100, but is not limited to such.

The capacitive sensor apparatus 100 when implemented as a touchpad that includes three capacitive sensors 112, 114 and 116 can include a substrate 102 having conductive traces (or electrodes) 104, 106 and 108 patterned (or formed) thereon. Substrate 102 of capacitive sensor 100 can be implemented with, but is not limited to, one or more insulating materials that are utilized as a substrate for a capacitive touchpad device. Each of conductive traces 104, 106 and 108 can define a sensing region 112, 114 and 116, respectively, which can each be utilized as a capacitive sensor button of capacitive sensor 100. Note that the sensing pattern shown within each of sensing regions 112, 114 and 116 are exemplary. As such, each of sensing regions 112, 114 and 116 can include any type of sensing pattern formed by the conductive traces 104, 106 and 108, respectively. Each of conductive traces 104, 106 and 108 can be coupled to sensing circuitry 110, thereby enabling the operation of capacitive sensor buttons 112, 114 and 116.

It is noted that although FIG. 1 show three capacitive sensor buttons 112, 114 and 116, capacitive sensor 100 may be implemented in a wide variety of ways. Each of capacitive buttons 112, 114 and 116 has been implemented with a single conductive trace or electrode 104, 106 and 108, respectively. However, each of capacitive buttons 112, 114 and 116 can be implemented using multiple conductive traces (not shown). It is also noted that the exemplary sensing element pattern shown within each of sensing regions 112, 114 and 116 is one of any number of sensing element patterns that can be implemented in accordance with various embodiments of the invention. For example, each of sensing regions 112, 114 and 116 can be implemented as a matrix of intersecting electrodes or alternate patterns with or without intersecting electrodes. Although each of sensing regions 112, 114 and 116 is also shown having a square characteristic, it is not limited to such, and each can be implemented having a round or ring-like characteristic, or any other shape having any number of straight or curved aspects. The capacitive sensor 100 can also be implemented as a two-dimensional capacitive sensor (not shown), or as a one-dimensional capacitive sensor (not shown), or as one or more buttons (such as the ones shown), but is not limited to such.

Figure 2:
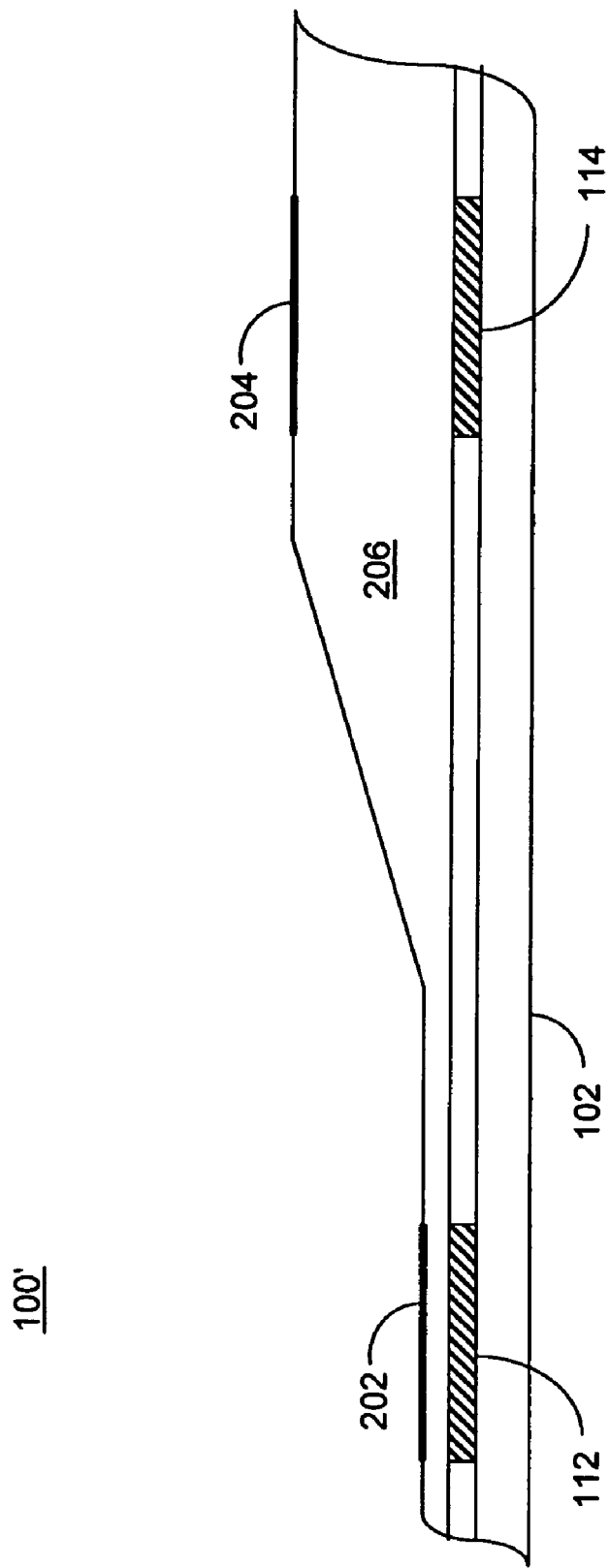
FIG. 2 is a side sectional view of an exemplary capacitive sensor that can be utilized with one or more embodiments in accordance with the invention.

FIG. 2 is a side sectional view of a capacitive sensor apparatus 100' in accordance with various embodiments of the invention. Specifically, capacitive sensor apparatus 100' has been implemented underneath a solid casing 206 that could be associated with a computing device or other electronic device. The casing 206 can include indicators or markers 202 and 204, which are located above capacitive sensing regions (or capacitive buttons) 112 and 114, respectively. It is noted that the markers 202 and 204 can be for indicating to a user where to touch in order to utilize capacitive buttons 112 and 114.

It is noted that the amount of material of casing 206 located above button 112 is much thinner than the amount of material of casing 206 located above button 114. As such, the capacitive sensitivity of capacitive sensor buttons 112 and 114 through the material of casing 206 can be very different from each other. For example, the amount of material of casing 206 located above capacitive sensor button 114 can dull (or lower) capacitive sensor button 114's sensitivity to sensing an object or finger located on marker 204 in comparison to the capacitive sensor button 112's sensitivity through the amount of casing material above capacitive sensor button 112.

Figure 3:
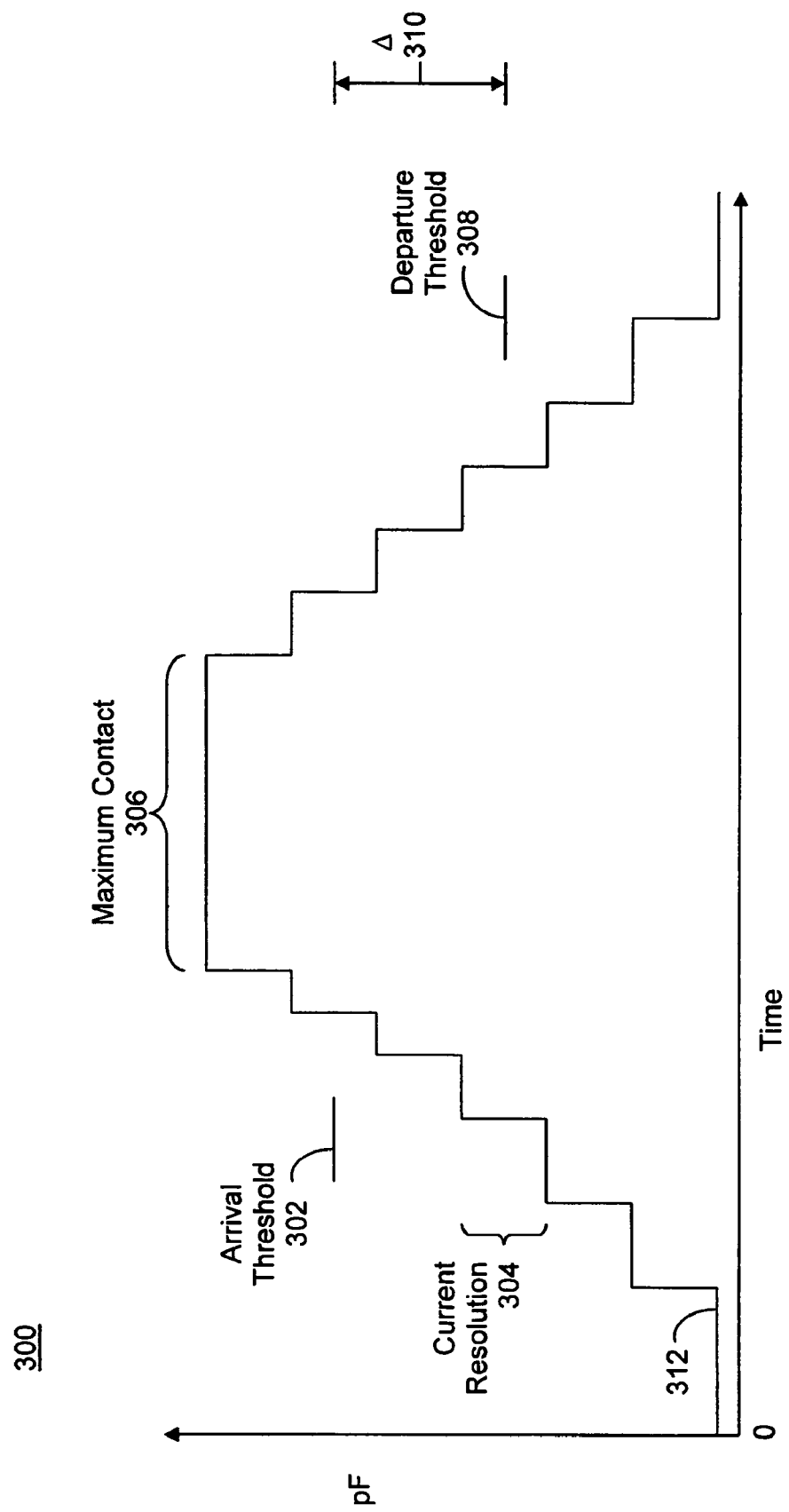
FIG. 3 is an exemplary graph in accordance with various embodiments of the invention.

FIG. 3 is an exemplary graph of a measure analog-to-digital conversion (ADC) signal 312 associated with a capacitive sensor button (e.g., 112) in accordance with various embodiments of the invention. Specifically, at time equal to zero, a finger or object is far away from the capacitive sensor button 112. However, as the finger or object approaches the capacitive sensor button 112, the ADC signal 312 ascends in a stair step manner, which is based on the current resolution 304 of the sensing circuitry associated with capacitive sensor button 112. Graph 300 includes an arrival threshold 302 that indicates the point at which the sensing circuit 110 recognizes that the finger (or object) has activated capacitive sensor button 112. Once the finger or object is in maximum contact with capacitive sensor button 112, the ADC signal 312 peaks and levels out as indicated by maximum contact 306.

As the finger or object is removed from capacitive sensor button 112, the ADC signal 312 descends in a stair step manner. Graph 300 also includes a departure threshold 308 that indicates the point at which the sensing circuit 110 recognizes that the finger (or object) has left the capacitive sensor button 112. It is understood that the arrival threshold 302 and the departure threshold 308 provide sensing hysteresis for the sensing circuitry 110 of capacitive sensor button 112. Note that the difference ($\Delta$) 310 between the arrival threshold 302 and the departure threshold 308 can be implemented in a wide variety of ways. For example, within graph 300, the difference 310 is substantially equal to two current resolution steps 304.

Figure 4:
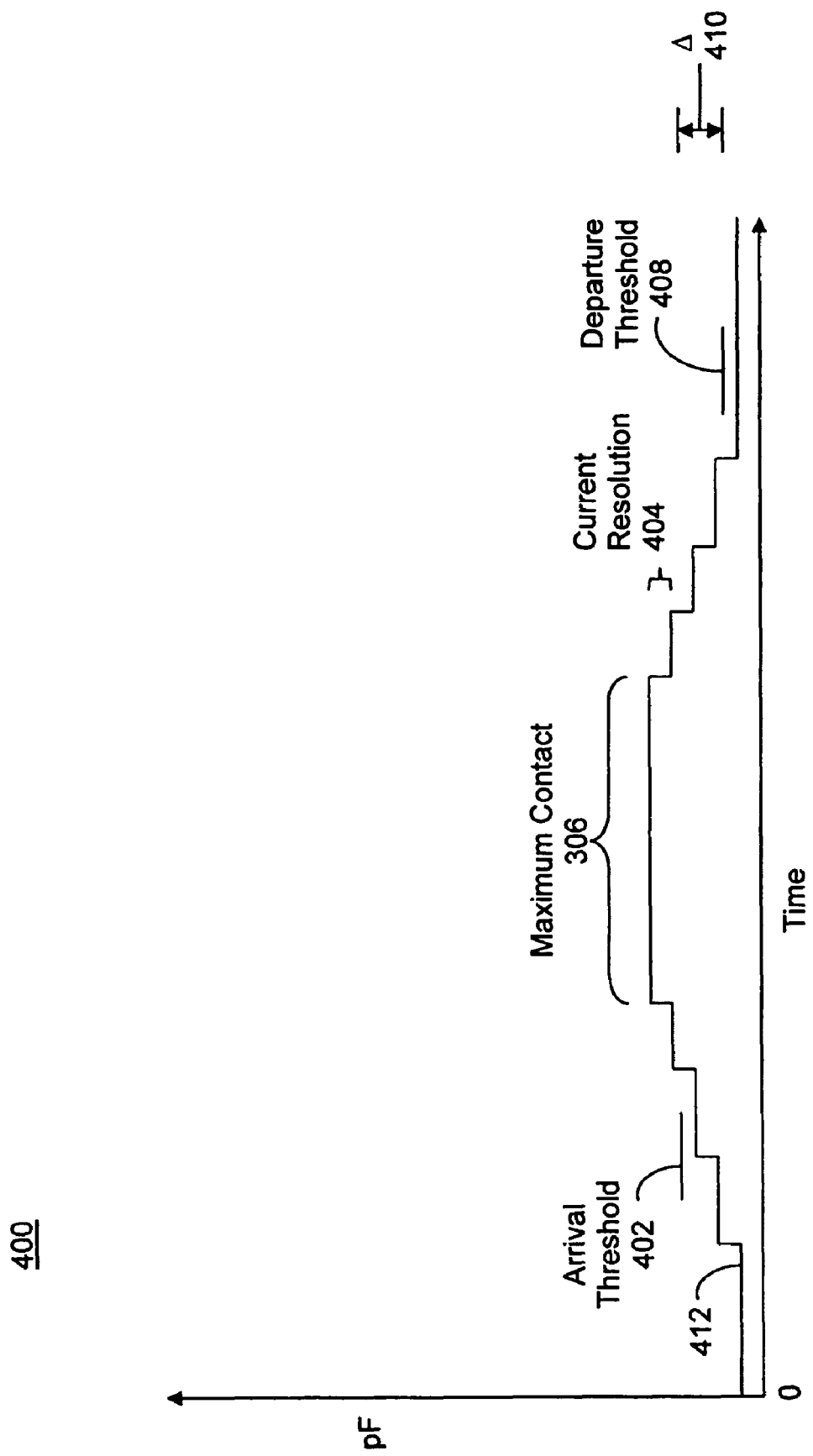
FIG. 4 is another exemplary graph in accordance with various embodiments of the invention.

It is understood that graph 300 of FIG. 3 can represent the resolution and sensitivity of capacitive sensor button 112. Furthermore, an ADC signal 412 of graph 400 shown in FIG. 4 can represent the resolution and sensitivity of capacitive sensor button 114 (in the situation shown in FIG. 2) in accordance with various embodiments of the invention. It is pointed out that graph 300 and graph 400 have the same scale on their X-axis and Y-axis. However, since the current resolution 404 of graph 400 is so much smaller in comparison to the current resolution 304 of graph 300, the resolution settings for capacitive sensor buttons 112 and 114 can be considered mutually inappropriate. Specifically, the arrival threshold 402 of graph 400 and the departure threshold 408 (and the difference 410 between them) are smaller than a single current resolution 304 of graph 300.

As such, various embodiments of the invention can create and use a single calculated metric, which can embody all the necessary complexity of the measurement system to evaluate whether the sensing system resolution at the current settings (resolution & sensitivity) is adequate to solve the problem. The basic form of the exemplary metric is:

$$\text{Resolution Metric} = \frac{\text{Required Resolution}}{\text{Current Resolution}}$$

In one embodiment of the invention, this is an analog metric and in the form above any value greater than 1 (current resolution<required) would be suitable and any value less than 1 (current resolution>required resolution) would be unsuitable. For example, if the sensitivity setting of a capacitive touch sensing system required resolving capacitance to 0.02 picofarads (pF) and the current system settings generated 0.05 pF resolution, this would result in a resolution metric of 0.02/0.05=0.4, thereby resulting in an unsuitable value.

Often a sensor system such as a capacitive touch sensing system (e.g., 100) has many different sensors and/or sensors segmented into many electrodes (e.g., 104, 106 and 108), each of whose capacitance can be measured. In one embodiment of the invention, these independently measured sensors or electrodes can be referred to as "channels."

The resolution metric calculation can be made for each channel and an overall metric for a system composed of several channels can be the minimum of the metrics for each of the channels:

System Resolution Metric=minimum (channel resolution metric of the several channels)

In many systems, such as the Synaptics™ T100x chips, the current resolution of the electronics is a relatively complex relationship involving high and low reference capacitor settings and baseline reading of the channel in question. Each channel may also have individual sensitivity settings established by the customer or designer as part of the configuration. Based on the methods to be used (e.g., for button, one-dimensional strip or ring, or two-dimensional pad), required resolution for each channel can be established. The required resolution may be based upon theory or it may be established as the result of empirical and/or usability experiments.

Embodiments of the invention include a software system to calculate resolution metrics for each channel, which provides a considerable service to the customers of the system while avoiding teaching them the necessary understanding of the system complexity to evaluate it themselves. In particular, embodiments of the invention include a software system to calculate resolution metrics without requiring complex user operations. In one embodiment of the invention, complex user operations can include, but are not limited to, calculating and/or determining the resolution of one or more channel's electronics, calculating and/or determining the resolution required for one or more channel, and calculating and/or determining a resolution metric based on a required channel resolution or the resolution of a channel's electronics. However, it is appreciated that complex user operations could include any operations the user may perform to determine resolution characteristics of one or more sets of electronics on one or more channels in accordance with embodiments of the invention.

In one embodiment of the invention, at design time, a system running the exemplary software of the invention can calculate the resolution metric and use that metric to tell a designer which ones of several possible electronic configurations, e.g., printed circuit board (PCB) configurations, are adequate (e.g., beyond a threshold metric value) or which one is best suited to the job (e.g., greatest value of the metric). Also, designs with inadequate resolution can be flagged such that a designer can stop and modify it.

The exemplary metric in accordance with the invention can also be used during manufacture. During manufacture, part-to-part variation can affect the resolution achieved and possibly the resolution required. By measuring and calculating the overall resolution metric for each part, an operator or an automated inspection system can make a decision as to whether or not a part should be shipped to eventually be utilized by a customer. While the shipment decision could be based on the overall metric (the minimum of the channel metrics), additional information from the individual channel metrics could also be used to understand the source of the problem for subsequent yield improvement efforts.

In the case of commercially available Synaptics™ T100x chips, the chip can measure a voltage to 10 bit resolution as a proxy of the capacitance it would like to measure. The amount of capacitance represented by a given 10 bit analog-to-digital conversion (ADC) baseline reading can be a function of:

Capacitance=$f$(maxADCvalue, minADCvalue, baseline ADC reading, capacitance to guard, guard setting)

where "f" is a mathematical function of the indicated variables. It is noted that the exact "f" function depends on the sensing method used and other details of the system.

As for the "ADC reading," most known capacitance sensing methods use some type of analog-to-digital conversion (ADC) to convert a continuous amount of capacitance into a quantized digital number. Synaptics chips have a successive-approximation ADC circuit for this purpose, but others use different ADC circuits or methods such as counting the number of pulses needed to charge a capacitance to a voltage trigger point. In this case, the resolution can be determined by the amount of capacitance represented by a single charging pulse. No matter which method is used, there is an inherent resolution in capacitance units determined by the largest amount of capacitance that can correspond to a unit step in the ADC output.

In one embodiment of the invention, the terms "minADCvalue" and "maxADCvalue" represent the lower and upper capacitance bounds measurable by the system. For example, for Synaptics™ T100x chips, they are set by reference capacitors. In other sensing methods, these bounds are manifested differently. For example, in a pulse counting method, "maxADCvalue" is set by the maximum number of pulses that can occur within the acceptable time to do a capacitance measurement, and the size of the sample capacitor(s) that are charged by the pulses. However, it is appreciated that any number of ways for determining the upper and lower capacitance bounds can be utilized in accordance with various embodiments of the invention.

In one embodiment of the invention, it is advantageous to use the same "minADCvalue" and/or "maxADCvalue" with many sensor channels. For example, on a Synaptics chip each "axis" of sensing electrodes has a single shared minADCvalue and a single shared maxADCvalue. In a pulse counting system, the measurement period may be the same for all channels, and it may be preferable to use the same sample capacitor value to simplify the bill of materials or to allow one sample capacitor to be multiplexed for several channels; again, this causes the channels to share a common "maxADCvalue". In these systems, it can be desirable for "minADCvalue" and "maxADCvalue" to be set far enough apart to cover not just the variation of a single capacitance sensor but also the range of variations among the background or guard coupling capacitances of the various channels. It is noted that minimizing the background variations allows greater resolution; and this process can be referred to as "balancing" a group of channels. The overall resolution metric for a group of channels can indicate how well-balanced they are as a group.

In one embodiment of the invention, the "capacitance to guard" denotes the capacitive coupling to guard electrode(s), if they are used in the system. The "guard setting" can represent any adjustments or parameters that control the operation of the guard electrode(s).

In one embodiment of the invention, the amount of change required in an ADC reading varies with sensing technology (e.g., application-specific integrated circuit (ASIC) design) and operating conditions. For example, it is estimated that to reliably detect an object or finger presence on a button using some commercially available Synaptics chips, the change in ADC reading represented by the arrival of a user's finger on the sensor should be a least 10 ADC units to as much as 30 ADC units, depending on the finger presence algorithm used. By substituting the values for a particular part into the equation above, the current resolution for a given channel can be established (Note that the terms reflect the measurements with and without the presence of the object or finger, and it has been assumed that maxADCvalue, minADCvalue, capacitance to guard, and guard setting did not change between the two states.):

$$\Delta \text{ Capacitance per ADC} = f\{\text{maxADCvalue, minADCvalue, baseline ADC+1, capacitance to guard, guard setting}\} - f\{\text{maxADCvalue, minADCvalue, baseline ADC, capacitance to guard, guard setting}\}$$

This can then be compared to the resolution (in Δ Capacitance) required by the sensitivity settings and the algorithm used, which establish the required resolution for reliable touch determination.

In one embodiment of the invention, approximations of the full equation may be used. For example, some elements of the equation may be omitted, such as capacitance to guard and guard setting may be ignored when they are either unknown or known to be constant factors which do not change significantly.

In one embodiment of the invention, if a device is known to operate over a range of parameter values (such as a range of ADC reading levels or a range of guard capacitances), the current resolution can be established as the maximum Δ Capacitance per ADC over the expected range of all the parameters.

Figure 5:
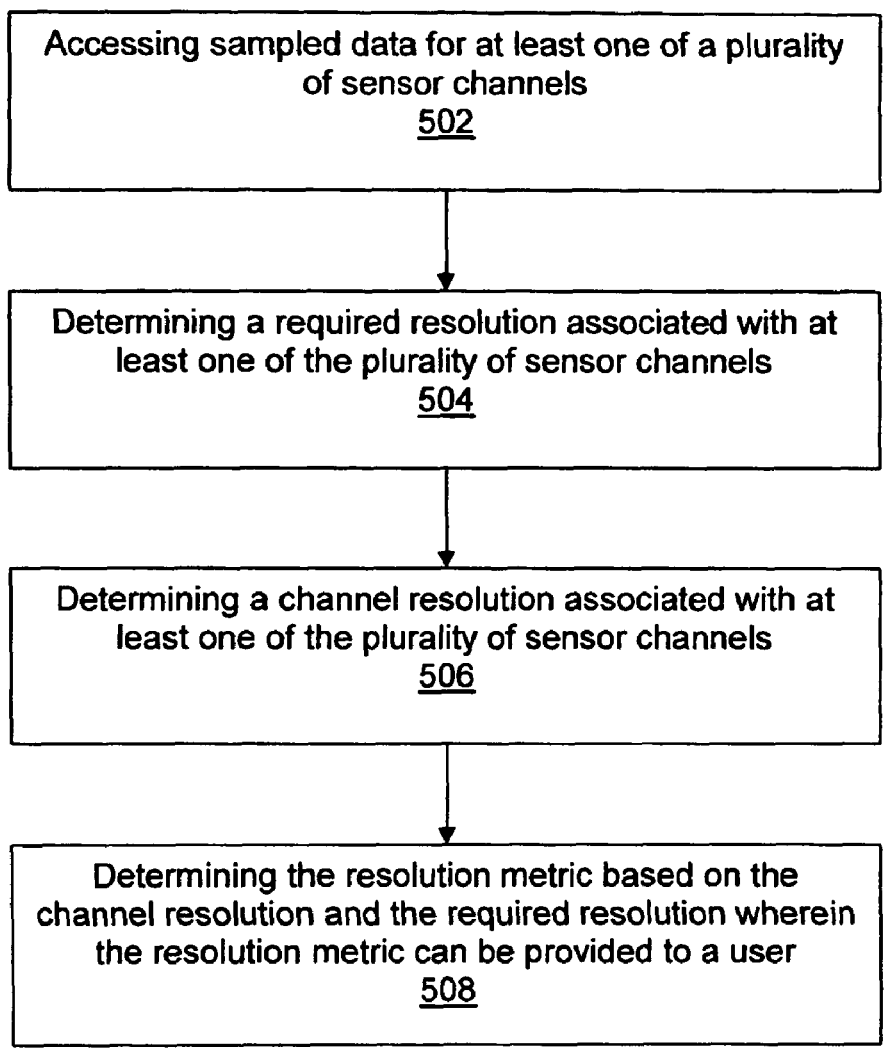
FIG. 5 is a flow diagram of an exemplary method in accordance with various embodiments of the invention.

FIG. 5 is a flow diagram of a method 500 for determining a resolution metric in accordance with various embodiments of the invention. Method 500 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that can be usable by a computing device. However, the computing device readable and executable instructions (or code) may be stored on any type of computing device readable medium or computer-usable medium. Although specific operations are disclosed in method 500, such operations are exemplary. Method 500 may not include all of the operations illustrated by FIG. 5. Also, method 500 may include various other operations and/or variations of the operations shown by FIG. 5. Likewise, the sequence of the operations of method 500 can be modified. It is noted that the operations of method 500 can be performed by software, by firmware, by electronic hardware, or by any combination thereof.

Specifically, method 500 can include accessing sampled data for at least one of a plurality of sensor channels. Additionally, method 500 can include determining a required resolution associated with at least one of the plurality of sensor channels. A channel resolution can be determined that is associated with at least one of the plurality of sensor channels. Furthermore, the resolution metric can be determined based on the channel resolution and the required resolution, wherein the resolution metric can be provided to a user.

At operation 502 of FIG. 5, sampled data can be accessed for at least one of a plurality of sensor channels. It is noted that operation 502 can be implemented in a wide variety of ways. For example in various embodiments, the sampled data can be associated with sampling at least two (or all) of the plurality of sensor channels substantially concurrently. In various embodiments, the sampled data can be associated with sampling at least two (or all) of the plurality of sensor channels in a sequential manner. In various embodiments, the sampled data can be associated with sampling at least one (or all) of the plurality of sensor channels utilizing just a single master reference capacitor, but is not limited to such. In various embodiments, operation 502 can include accessing simulated sampled data for at least one of the plurality of sensor channels associated with a capacitive sensing system being designed. In various embodiments, the sampled data was generated by prompting a user (e.g., via a graphical user interface (GUI)) to perform a task (e.g., touching at least one of the plurality of sensor channels, touching a capacitive sensor button, a capacitive sensor electrode or trace, and the like), which does not require the user to perform any complex user operations. Note that operation 502 can be implemented in any manner similar to that described herein, but is not limited to such.

At operation 504, a required resolution can be determined that is associated with at least one of the plurality of sensor channels. It is understood that operation 504 can be implemented in a wide variety of ways. For example in various embodiments, the required resolution can be calculated for at least one (or each) of the plurality of sensor channels, based on the sensitivity setting and the known qualities of the algorithm to be used. Note that operation 504 can be implemented in any manner similar to that described herein, but is not limited to such.

At operation 506 of FIG. 5, a channel resolution can be determined that is associated with at least one of the plurality of sensor channels. It is appreciated that operation 506 can be implemented in a wide variety of ways. For example in various embodiments, the channel resolution electronics can be calculated for at least one (or each) of the plurality of sensor channels based on the current baseline ADC and maxADCvalue and minADCvalue. Note that operation 506 can be implemented in any manner similar to that described herein, but is not limited to such.

At operation 508, the resolution metric can be determined based on the channel resolution and the required resolution, wherein the resolution metric can be provided to a user. It is noted that operation 508 can be implemented in a wide variety of ways. For example in various embodiments, the resolution metric can be determined based on the channel resolution and the required resolution and then feedback can be provided to a designer, manufacture process, and/or user. In various embodiments, the resolution metric can be determined by dividing the required resolution by the channel resolution. Note that operation 508 can be implemented in any manner similar to that described herein, but is not limited to such.

Figure 6:
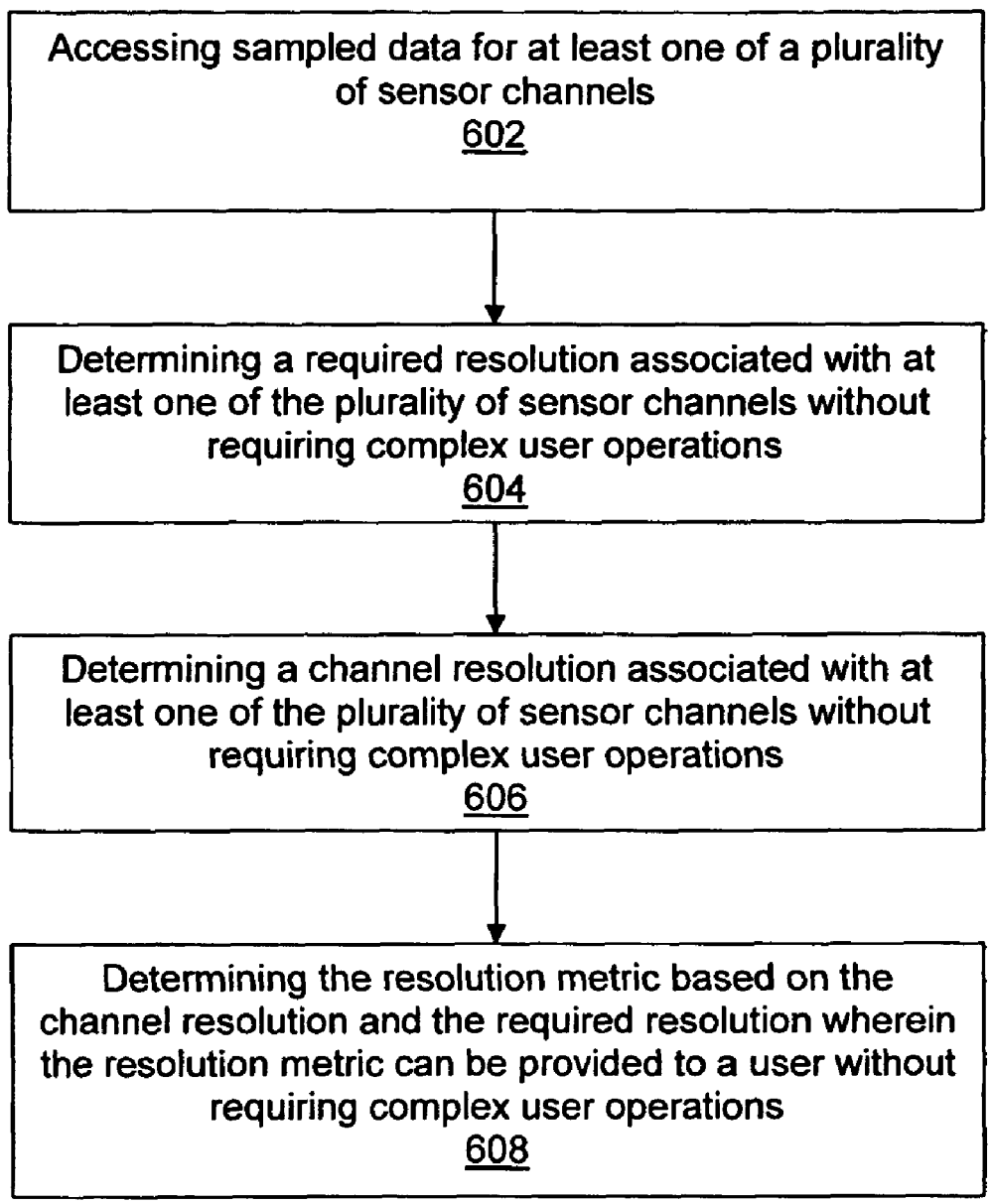
FIG. 6 is a flow diagram of another exemplary method in accordance with various embodiments of the invention.

FIG. 6 is a flow diagram of a method 600 for determining a resolution metric without requiring complex user operations in accordance with various embodiments of the invention. Method 600 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that can be usable by a computing device. However, the computing device readable and executable instructions (or code) may be stored on any type of computing device readable medium or computer-usable medium. Although specific operations are disclosed in method 600, such operations are exemplary. Method 600 may not include all of the operations illustrated by FIG. 6. Also, method 600 may include various other operations and/or variations of the operations shown by FIG. 6. Likewise, the sequence of the operations of method 600 can be modified. It is noted that the operations of method 600 can be performed by software, by firmware, by electronic hardware, or by any combination thereof.

Specifically, method 600 can include accessing sampled data for at least one of a plurality of sensor channels. The method 600 can include determining a required resolution associated with at least one of the plurality of sensor channels without requiring complex user operations. A channel resolution can be determined that is associated with at least one of the plurality of sensor channels without requiring complex user operations. Moreover, the resolution metric can be determined based on the channel resolution and the required resolution, wherein the resolution metric can be provided to a user without requiring complex user operations.

At operation 602 of FIG. 6, sampled data can be accessed for at least one of a plurality of sensor channels. It is noted that operation 602 can be implemented in a wide variety of ways. For example in various embodiments, the sampled data was generated by prompting a user to perform a task (e.g., touch a capacitive sensor button, a capacitive sensor electrode or trace, and the like) which does not require the user to perform any complex user operations. Note that operation 602 can be implemented in any manner similar to that described herein, but is not limited to such.

At operation 604, a required resolution can be determined that is associated with at least one of the plurality of sensor channels without requiring complex user operations. It is understood that operation 604 can be implemented in a wide variety of ways. For example, operation 604 can be implemented in any manner similar to that described herein without requiring complex user operations, but is not limited to such.

At operation 606 of FIG. 6, a channel resolution can be determined that is associated with at least one of the plurality of sensor channels without requiring complex user operations. It is appreciated that operation 606 can be implemented in a wide variety of ways. For example, operation 606 can be implemented in any manner similar to that described herein without requiring complex user operations, but is not limited to such.

At operation 608, the resolution metric can be determined based on the channel resolution and the required resolution, wherein the resolution metric can be provided to a user, a designer, and/or manufacture process without requiring complex user operations. It is noted that operation 608 can be implemented in a wide variety of ways. For example, operation 608 can be implemented in any manner similar to that described herein without requiring complex user operations, but is not limited to such.

Figure 7:
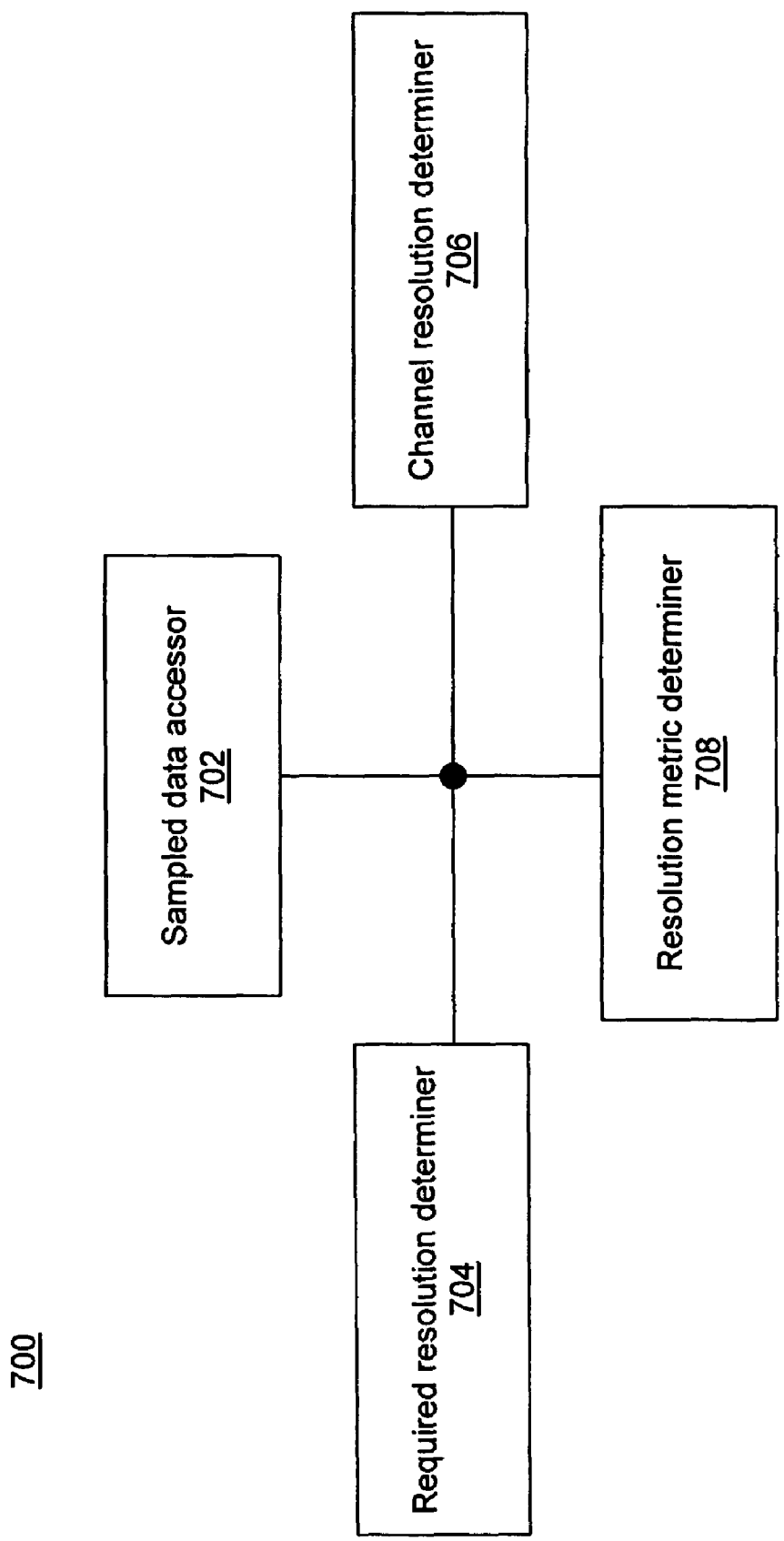
FIG. 7 is a block diagram of an exemplary system in accordance with various embodiments of the invention.

FIG. 7 is a block diagram of an exemplary system 700 for determining a resolution metric in accordance with various embodiments of the invention. Specifically, system 700 can include a sampled data accessor 702, a required resolution determiner 704, a channel resolution determiner 706, and resolution metric determiner 708, which can each be referred to as a module. Furthermore, it is understood that each of the sampled data accessor 702, required resolution determiner 704, channel resolution determiner 706, and resolution metric determiner 708 can be implemented with software, firmware, electronic hardware, or any combination thereof. Moreover, each of the sampled data accessor 702, required resolution determiner 704, channel resolution determiner 706, and resolution metric determiner 708 can be coupled to each other. Note that system 700 can include additional or fewer elements than those shown in FIG. 7.

Within system 700, the sampled data accessor 702 can be for accessing sampled data for at least one of a plurality of sensor channels. Additionally, the required resolution determiner 704 can be coupled to the sampled data accessor to receive the sampled data. The required resolution determiner 704 can be for determining a required resolution associated with at least one of the plurality of sensor channels. Moreover, the channel resolution determiner 706 can be coupled to the required resolution determiner and the channel resolution determiner 706 can be for determining a channel resolution associated with at least one of the plurality of sensor channels. The resolution metric determiner 708 can be coupled to the channel resolution determiner 706 to receive the channel resolution and the resolution metric determiner 708 can be coupled to the required resolution determiner 704 to receive the required resolution. The resolution metric determiner 708 can be for determining the resolution metric based on the channel resolution and the required resolution, wherein the resolution metric can be provided to a user.

In addition to evaluating suitability of designs and as a factory manufacture screen, the exemplary metric of the invention could also be calculated in the field by hand, by test equipment, and the like to provide feedback on the continued reliability of the device in a given environment or a system subject to change over time. If the metric calculated is found to be unsuitable, the device could warn the user, phone a central location for maintenance, change operating algorithms, take other appropriate actions to avoid consequences of running with inappropriate resolution for its intended purpose, or any other action in accordance with embodiments of the invention.

Although various embodiments in accordance with the invention have been presented herein with a focus on capacitive sensing devices, it is understood that the same approach can be applied to other sensing technologies with multiple channels having differing resolution and sensitivity characteristics in accordance with various embodiments of the invention.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the claims and their equivalents.

What is claimed is:

1. A method for determining a resolution metric comprising:
   accessing sampled data for at least one of a plurality of capacitive sensor channels in capacitive touch sensors;
   determining a required resolution associated with at least one of said plurality of capacitive sensor channels in said capacitive touch sensors;
   determining a channel resolution associated with at least one of said plurality of capacitive sensor channels in said capacitive touch sensors; and
   determining said resolution metric based on a ratio of said channel resolution and said required resolution wherein said resolution metric can be provided to a user, wherein for a plurality of channels said resolution metric is set to a minimum of determined individual resolution metrics for each of said plurality of channels.

2. The method as recited in claim 1 wherein said resolution metric is determined at a design time for a capacitive sensing system comprising said at least one of said plurality of capacitive sensor channels in said capacitive touch sensors.

3. The method as recited in claim 1 wherein said sampled data is associated with sampling at least two of said plurality of capacitive sensor channels in said capacitive touch sensors substantially concurrently.

4. The method as recited in claim 1 wherein said sampled data is associated with sampling at least two of said plurality of capacitive sensor channels in said capacitive touch sensors in a sequential manner.

5. The method as recited in claim 1 wherein said determining said resolution metric comprises dividing said required resolution by said channel resolution.

6. A non-transitory computer-readable storage medium having computer-readable instructions stored thereon, wherein the computer-readable instructions, when executed, cause a computer system to perform a method for determining a resolution metric, the method comprising:
   accessing sampled data for at least one of a plurality of capacitive sensor channels in capacitive touch sensors;
   determining a required resolution associated with at least one of said plurality of capacitive sensor channels in said capacitive touch sensors;
   determining a channel resolution associated with at least one of said plurality of capacitive sensor channels in said capacitive touch sensors; and
   determining said resolution metric based on a ratio of said channel resolution and said required resolution, wherein for a plurality of channels said resolution metric is set to a minimum of determined individual resolution metrics for each of said plurality of channels, and wherein said resolution metric can be provided to a user.

7. The computer-readable storage medium of claim 6 wherein said computer-readable instructions further cause said computer system to perform said method for determining said resolution metric at a design time for a capacitive sensing system comprising said at least one of said plurality of capacitive sensor channels in said capacitive touch sensors.

8. The computer-readable storage medium of claim 6 wherein said computer-readable instructions further cause said computer system to perform said method for determining said resolution metric during manufacture of a capacitive sensing system comprising said at least one of said plurality of capacitive sensor channels in said capacitive touch sensors.

9. The computer-readable storage medium of claim 6 wherein said determining said resolution metric comprises dividing said required resolution by said channel resolution.

10. The computer-readable storage medium of claim 6 wherein said sampled data is associated with sampling at least two of said plurality of capacitive sensor channels in said capacitive touch sensors substantially concurrently.

11. A system for determining a resolution metric comprising:
   a sampled data accessor for accessing sampled data for at least one of a plurality of capacitive sensor channels in capacitive touch sensors;
   a required resolution determiner coupled to said sampled data accessor, said required resolution determiner for determining a required resolution associated with at least one of said plurality of capacitive sensor channels in said capacitive touch sensors;
   a channel resolution determiner coupled to said required resolution determiner, said channel resolution determiner for determining a channel resolution associated with at least one of said plurality of capacitive sensor channels in said capacitive touch sensors; and
   a resolution metric determiner coupled to said channel resolution determiner, said resolution metric determiner for determining said resolution metric based on a ratio of said channel resolution and said required resolution, wherein for a plurality of channels said resolution metric determiner sets said resolution metric to a minimum of determined individual resolution metrics for each of said plurality of channels, and wherein said resolution metric can be provided to a user.

12. The system of claim 11 wherein said resolution metric determiner for determining said resolution metric by dividing said required resolution by said channel resolution.

13. The system of claim 11 wherein said sampled data is associated with sampling at least two of said plurality of capacitive sensor channels in said capacitive touch sensors substantially concurrently.

14. The system of claim 11 wherein said sampled data is associated with sampling at least two of said plurality of capacitive sensor channels in said capacitive touch sensors in a sequential manner.

15. The system of claim 11 wherein said sampled data is associated with sampling at least two of said plurality of capacitive sensor channels in said capacitive touch sensors utilizing only a single reference capacitor.

16. A computer-implemented method for determining a resolution metric for a capacitive sensing system being designed, said computer-implemented method comprising:
   accessing sampled data for at least one of a plurality of capacitive sensor channels in capacitive touch sensors associated with said capacitive sensing system being designed;
   determining a required resolution associated with at least one of said plurality of capacitive sensor channels in said capacitive touch sensors associated with said capacitive sensing system being designed;
   determining a channel resolution associated with at least one of said plurality of capacitive sensor channels in said capacitive touch sensors associated with said capacitive sensing system being designed; and
   determining said resolution metric, for said capacitive sensing system being designed, based on a ratio of said channel resolution and said required resolution, wherein for a plurality of channels said resolution metric is set to a minimum of determined individual resolution metrics for each of said plurality of channels, and wherein said resolution metric can be provided to a user.

17. The computer-implemented method as recited in claim 16 wherein said accessing sampled data for at least one of a plurality of capacitive sensor channels in said capacitive touch sensors associated with said capacitive sensing system being designed comprises accessing simulated sampled data for at least one of a plurality of capacitive sensor channels associated with said capacitive sensing system being designed.

18. The computer-implemented method as recited in claim 16 wherein said determining said resolution metric during manufacture of a capacitive sensing system comprising said at least one of said plurality of capacitive sensor channels in said capacitive touch sensors.

19. The computer-implemented method as recited in claim 16 wherein said sampled data is associated with sampling at least two of said plurality of capacitive sensor channels in said capacitive touch sensors substantially concurrently.

20. The computer-implemented method as recited in claim 16 wherein said sampled data is associated with sampling at least two of said plurality of capacitive sensor channels in said capacitive touch sensors in a sequential manner.

21. A method for obtaining a resolution metric without requiring complex user operations, said method comprising:
   accessing sampled data for at least one of a plurality of capacitive sensor channels in capacitive touch sensors, wherein said sampled data was generated by prompting a user to perform a task which does not require said user to perform said complex user operations;
   determining a required resolution associated with at least one of said plurality of capacitive sensor channels in said capacitive touch sensors; and
   determining said resolution metric by utilizing said sampled data and a required capacitive sensor channel resolution of at least one of said capacitive sensor channels to form a ratio of said required resolution to a resolution of a capacitive channel for which said sampled data has been accessed, wherein for a plurality of channels said resolution metric is set to a minimum of determined individual resolution metrics for each of said plurality of channels, and wherein said resolution metric can be provided to a user.

22. The method as recited in claim 21 wherein said task comprises touching at least one of said plurality of capacitive sensor channels in said capacitive touch sensors.

23. The method as recited in claim 21 further comprising:
   determining a channel resolution associated with at least one of said plurality of capacitive sensor channels in said capacitive touch sensors.

* * * * *